United States Patent
Mikasa

(10) Patent No.: US 11,098,386 B2
(45) Date of Patent: Aug. 24, 2021

(54) STEEL SHEET AND METHOD OF MANUFACTURING SAME

(71) Applicant: NIPPON STEEL CORPORATION, Tokyo (JP)

(72) Inventor: Akira Mikasa, Tokyo (JP)

(73) Assignee: NIPPON STEEL CORPORATION, Tokyo (JP)

(*) Notice: Subject to any disclaimer, the term of this patent is extended or adjusted under 35 U.S.C. 154(b) by 70 days.

(21) Appl. No.: 16/605,778

(22) PCT Filed: Apr. 17, 2018

(86) PCT No.: PCT/JP2018/015876
§ 371 (c)(1),
(2) Date: Oct. 16, 2019

(87) PCT Pub. No.: WO2018/194059
PCT Pub. Date: Oct. 25, 2018

(65) Prior Publication Data
US 2020/0123631 A1 Apr. 23, 2020

(30) Foreign Application Priority Data
Apr. 17, 2017 (JP) .............................. JP2017-081036

(51) Int. Cl.
*C21D 6/00* (2006.01)
*C21D 8/02* (2006.01)
(Continued)

(52) U.S. Cl.
CPC ................ *C21D 9/46* (2013.01); *B32B 15/01* (2013.01); *B32B 15/013* (2013.01); *B32B 15/08* (2013.01);
(Continued)

(58) Field of Classification Search
CPC ..... C21D 8/0205; C21D 8/005; C21D 8/0226; C21D 8/0236; C21D 8/0247;
(Continued)

(56) References Cited

U.S. PATENT DOCUMENTS 4,124,412 A * 11/1978 Elias .................... C21D 8/0426
148/505
2017/0292176 A1 10/2017 Tsujimoto et al.

FOREIGN PATENT DOCUMENTS

JP 7-41903 A 2/1995
JP 10-280089 A 10/1998
(Continued)

OTHER PUBLICATIONS

English translation of the International Search Report (form PCT/ISA/210), dated Jul. 24, 2018, for International Application No. PCT/JP2018/015876.
(Continued)

*Primary Examiner* — Michael E. La Villa
(74) *Attorney, Agent, or Firm* — Birch, Stewart, Kolasch & Birch, LLP

(57) ABSTRACT

Steel sheet for cans high in strength and excellent in formability and appearance comprising C: 0.0010 to 0.0035%, Si: 0.050% or less, Mn: 0.10 to 0.50%, P: 0.040% or less, S: 0.040% or less, Al: less than 0.005%, N: 0.0050% or less and a balance of Fe and unavoidable impurities, wherein an average value of a ratio of length of crystal grains in a sheet thickness direction to length in a sheet width direction is 0.70 or more, a yield strength is 500 MPa or more, and, in a range of 0 to 90° of the rolling direction, a minimum value of an r-value is 1.50 or more, an average value of the r-value is 1.70 or more, and a difference of the maximum value and minimum value of the r-value is 0.50 or less.

13 Claims, 3 Drawing Sheets

(51) Int. Cl.

| | |
|---|---|
| *C21D 9/46* | (2006.01) |
| *B32B 15/01* | (2006.01) |
| *B32B 15/08* | (2006.01) |
| *B32B 15/18* | (2006.01) |
| *C22C 38/06* | (2006.01) |
| *C22C 38/04* | (2006.01) |
| *C22C 38/02* | (2006.01) |
| *C22C 38/00* | (2006.01) |
| *C21D 8/00* | (2006.01) |
| *C25D 3/30* | (2006.01) |
| *C25D 3/04* | (2006.01) |
| *C23C 30/00* | (2006.01) |
| *C25D 7/06* | (2006.01) |

(52) U.S. Cl.
CPC .............. *B32B 15/18* (2013.01); *C21D 6/001* (2013.01); *C21D 6/005* (2013.01); *C21D 6/008* (2013.01); *C21D 8/005* (2013.01); *C21D 8/0205* (2013.01); *C21D 8/0226* (2013.01); *C21D 8/0236* (2013.01); *C21D 8/0247* (2013.01); *C21D 8/0263* (2013.01); *C21D 8/0273* (2013.01); *C22C 38/00* (2013.01); *C22C 38/001* (2013.01); *C22C 38/002* (2013.01); *C22C 38/02* (2013.01); *C22C 38/04* (2013.01); *C22C 38/06* (2013.01); *C23C 30/00* (2013.01); *C23C 30/005* (2013.01); *C25D 3/04* (2013.01); *C25D 3/30* (2013.01); *C25D 7/06* (2013.01); *C25D 7/0614* (2013.01); *B32B 2250/02* (2013.01); *B32B 2250/03* (2013.01); *B32B 2250/40* (2013.01); *B32B 2255/06* (2013.01); *B32B 2255/205* (2013.01); *B32B 2307/50* (2013.01); *B32B 2307/54* (2013.01); *B32B 2307/5825* (2013.01); *B32B 2307/732* (2013.01); *B32B 2439/66* (2013.01); *Y10T 428/12556* (2015.01); *Y10T 428/12569* (2015.01); *Y10T 428/12708* (2015.01); *Y10T 428/12722* (2015.01); *Y10T 428/12854* (2015.01); *Y10T 428/12951* (2015.01); *Y10T 428/12972* (2015.01); *Y10T 428/12986* (2015.01)

(58) Field of Classification Search
CPC .... C21D 8/0263; C21D 8/0273; C21D 6/005; C21D 6/008; C21D 6/001; C21D 9/46; C22C 38/00; C22C 38/001; C22C 38/002; C22C 38/02; C22C 38/04; C22C 38/06; B32B 15/013; B32B 15/08; B32B 15/18; B32B 15/01; B32B 2250/03; B32B 2250/02; B32B 2250/40; B32B 2307/5825; B32B 2307/732; B32B 2307/50; B32B 2307/54; B32B 2439/66; B32B 2255/205; B32B 2255/06; C23C 30/00; C23C 30/005; C25D 7/06; C25D 7/0614; C25D 3/04; C25D 3/30; Y10T 428/12556; Y10T 428/12569; Y10T 428/12708; Y10T 428/12722; Y10T 428/12854; Y10T 428/12951; Y10T 428/12972; Y10T 428/12986

See application file for complete search history.

(56) References Cited

FOREIGN PATENT DOCUMENTS

| | | |
|---|---|---|
| JP | 11-315346 A | 11/1999 |
| JP | 2005-200751 A | 7/2005 |
| JP | 2016-79505 A | 5/2016 |
| WO | WO 2016/056239 A1 * | 4/2016 |

OTHER PUBLICATIONS

English translation of the Written Opinion of the International Searching Authority (form PCT/ISA/237), dated Jul. 24, 2018, for International Application No. PCT/JP2018/015876.

* cited by examiner (a)

(b)

(c)

STEEL SHEET AND METHOD OF MANUFACTURING SAME

FIELD

The present invention relates to steel sheet and a method of manufacturing the same, more particularly mainly relates to steel sheet for cans and a method of manufacturing the same.

BACKGROUND

Since the past, steel sheet for cans has been used for applications of lids, bodies, crowns, etc. In working steel sheet for cans such as two-piece bodies, suppressing formation of wrinkles by neck-in working, securing buckling strength of the can, suppressing the ear rate, etc. have been sought. For this reason, as described in PTL 1, art relating to the method for manufacturing steel sheet for cans has been the focus of R&D.

CITATIONS LIST

Patent Literature

[PTL 1] Japanese Unexamined Patent Publication No. 11-3153456

SUMMARY

Technical Problem

In recent years, from the viewpoint of lowering costs, reducing the thickness of steel sheet for cans down to the 0.10 mm level has been sought, but if reducing the thickness of the steel sheet, the can falls in compressive strength. To make up for the drop in compressive strength, it has been considered to raise the strength of the steel sheet itself. However, to keep wrinkles from forming due to buckling of the steel sheet, it has been discovered that the yield strength is preferably low. That is, with just raising the strength of the steel sheet in response to the demand for reduced thickness, formation of wrinkles cannot be suppressed, so sufficient formability cannot be secured. Therefore, it is desirable to manufacture steel sheet for cans free of formation of wrinkles and having excellent formability while securing strength at a low cost.

The present invention is an invention made with such a background and provides steel sheet for cans high in strength and excellent in formability and appearance and further reducing variation in the r-value in the width direction of the steel sheet and a method of manufacturing the same.

Solution to Problem

The inventors intensively studied a method for obtaining steel sheet for cans high in strength and excellent in formability and appearance and further reducing variation in the r-value in the width direction of the steel sheet. As a result, they discovered that by suitably adjusting the chemical constituents of the steel sheet and furthermore controlling the annealing conditions after cold rolling, it is possible to control the characteristics of the steel sheet. The present invention was further studied based on the above discovery. Its gist is as follows:

(1) Steel sheet comprising, by mass %, C: 0.0010 to 0.0035%, Si: 0.050% or less, Mn: 0.10 to 0.50%, P: 0.040% or less, S: 0.040% or less, Al: less than 0.005%, and N: 0.0050% or less and having a balance of Fe and unavoidable impurities, wherein an average value of a ratio of lengths of ferrite crystal grains in a sheet thickness direction to lengths in a sheet width direction is 0.70 or more, a yield strength is 500 MPa or more, and, in a range of 0 to 90° to a rolling direction, a minimum r-value is 1.50 or more, an average r-value is 1.70 or more, and a difference between a maximum r-value and the minimum r-value is 0.50 or less.

(2) The steel sheet according to (1), wherein in the range of 0 to 900 to the rolling direction, the minimum r-value is 1.60 or more and the average r-value is 1.75 or more.

(3) The steel sheet according to (1) or (2), wherein the surface of the steel sheet contains an Sn plating layer.

(4) The steel sheet according to (1) or (2), wherein the surface of the steel sheet contains a Cr plating layer.

(5) The steel sheet according to any one of (1) to (4), wherein the surface of one or both sides further contains a resin film.

(6) A method of producing a steel sheet comprising hot rolling, pickling, and cold rolling a slab comprising, by mass %, C: 0.0010 to 0.0035%, Si: 0.050% or less, Mn: 0.10 to 0.50%, P: 0.040% or less, S: 0.040% or less, Al: less than 0.005%, N: 0.0050% or less and a balance of Fe and unavoidable impurities, annealing an obtained cold rolled steel sheet by an annealing temperature T. time "t" of passage through a soaking zone, and sheet tension X at the soaking zone satisfying the following equation (1), then temper rolling the steel sheet: $100 \leq 0.027 \times \ln(t) \times T \times \ln(X) \leq 280$ (1) (where, "T" is the annealing temperature (° C.), "t" is the passage time (sec) through the soaking zone, and "X" is the sheet tension (MPa) at the soaking zone).

(7) The method of producing the steel sheet according to (6) further comprising plating a surface of the steel sheet with Sn.

(8) The method of producing the steel sheet according to (6) further comprising plating a surface of the steel sheet with Cr.

(9) The method of producing the steel sheet according to any one of (6) to (8) further comprising covering a surface of one or both sides with a resin film.

Advantageous Effects of Invention

According to the present invention, it is possible to provide steel sheet for cans high in strength and excellent in formability and appearance and a method of manufacturing steel sheet for cans high in strength and excellent in formability and appearance and further reducing variation in the r-value in the width direction of the steel sheet.

EMBODIMENTS OF INVENTION

Figure 1:
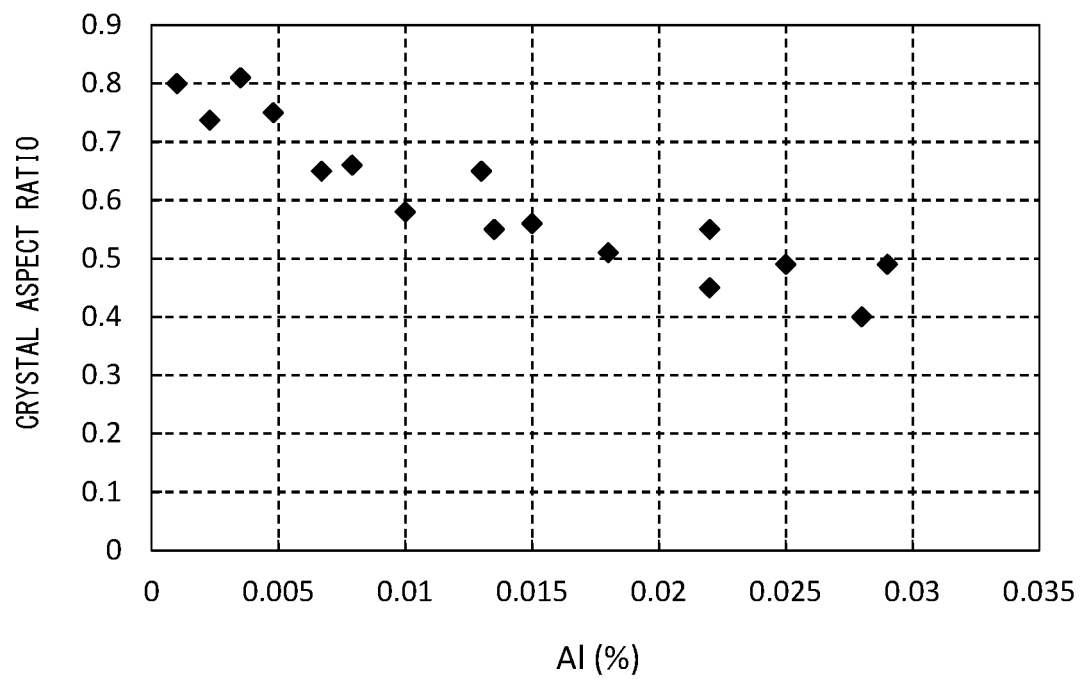
FIG. 1 is a view showing a relationship between a content of aluminum and an aspect ratio of crystals.

Below, embodiments of the present invention will be explained.

In general, to obtain a high strength, it is effective to increase the amount of C, but if the amount of C becomes greater, the r-value becomes lower. The r-value is the ratio of the amount of strain in the width direction to the amount of strain in the sheet thickness direction at the time of tensile deformation and is one of the parameters indicating the formability (deep drawability). In general, a larger r-value is preferable. The r-value being large means the amount of strain in the sheet thickness direction is smaller than the amount of strain in the width direction. It becomes possible to deep draw the sheet without reducing the sheet thickness. To obtain a high r-value, it is effective to reduce the amount of C, but if reducing the amount of C, it becomes difficult to secure the strength.

To reduce the amount of C and obtain high strength, it may be considered to add Mn or other alloy elements or perform temper rolling by a high rolling rate. However, adding alloy elements becomes high in cost. If raising the temper rolling too much, the anisotropy deteriorates and the difference between the maximum r-value and minimum r-value becomes greater and stable formability cannot be obtained. Therefore, it is difficult to achieve both a high strength and high r-value.

In the present embodiment, by keeping down the amount of C while making active use of the solute N, a high strength and high r-value are both achieved without increasing the costs and without raising the anisotropy of the steel sheet.

Specifically, to leave solute C for securing the strength, Ti, Nb, B, etc. are not added. Further, by reducing the addition of Al, N is kept from becoming AlN and solute N is left for securing strength. Due to this, high strength and high r-value are both achieved.

Below, the present embodiment will be explained in more detail. First, the constituents of the steel sheet will be explained. Below, "%" means "mass %".

C: 0.0010 to 0.0035%

C is an element added for securing strength. With an amount of C of less than 0.0010%, the necessary strength cannot be secured. If the amount of C exceeds 0.0035%, the necessary r-value cannot be secured. For this reason, the amount of C is 0.0010% to 0.0035%. From the viewpoint of securing a suitable strength, making it 0.0015% to 0.0035% is preferable.

Al: less than 0.005%

Al is an element normally used for deoxidation of steel. In the steel sheet of the present embodiment, to make the N in the steel the solute N without making it AlN, the amount of addition is reduced as greatly as possible. If the content of Al in the steel sheet is less than 0.005%, solution strengthening of N is obtained without substantially making the solute N in the steel AlN. Further, if the amount of Al is less than 0.005%, a good aspect ratio of ferrite crystal grains is obtained. To greatly reduce the Al in the steel sheet, in the present embodiment, the later explained Mn is used for deoxidation. The preferable amount of Al is 0.003% or less, more preferably 0.002% or less.

Si: 0.050% or less

Si is an element effective for securing strength. Further, it is also effective for deoxidation. However, it is not an essential element in the present embodiment. If the amount of Si exceeds 0.050%, surface defects called "scale patterns" occur in the hot rolling process and the appearance is impaired, so the amount of Si is made 0.050% or less. To obtain the effects of deoxidation and securing strength, inclusion of 0.005% or more is preferable. For this reason, the amount of Si is preferably 0.005% to 0.050%. From the viewpoint of corrosion resistance, 0.005% to 0.030% is more preferable.

Mn: 0.10 to 0.50%

Mn is an element effective for preventing hot tearing due to S and stabilizing the appearance. Further, in the present embodiment, it is a deoxidizing element taking the place of Al, so 0.10% or more is included. Excessive addition of Mn causes deterioration of the corrosion resistance. It causes the deterioration of the cold rollability and formability by hardening of the steel sheet and has a detrimental effect on the appearance, so is made 0.50% or less. For this reason, the amount of Mn is 0.10% to 0.50%.

P: 0.040% or less

P is an element causing hardening of the steel and causing deterioration of the workability. Further, it causes shaping defects and also has a detrimental effect on the appearance, so the content is made 0.040% or less. To secure better formability, it is preferably made 0.020% or less. The content of P may also be 0, but from the viewpoints of dephosphorization costs and time, 0.001% or more may be contained.

S: 0.040% or less

S is an element present as an inclusion in steel and reducing the ductility. Furthermore, it causes surface cracks and causes poor appearance and degraded corrosion resistance, so the content is made 0.040% or less. In particular, if excellent corrosion resistance is required, making it 0.005% or less is preferable. The content of S may be 0, but from the viewpoint of desulfurization costs and time, 0.001% or more may also be contained.

N: 0.0050% or less

N is an element necessary for increasing the strength of the steel sheet due to solution strengthening. Usually, N is contained in 0.0010% or more as an impurity even if not deliberately added. By reducing the amount of Al, solution strengthening by N is obtained, so the lower limit is not prescribed. On the other hand, if N exceeds 0.0050%, the r-value falls, so the content is made 0.0050% or less. From the viewpoint of strength, the preferable lower limit of N is 0.020%. From the viewpoint of the r-value, the preferable upper limit is 0.0040%.

The balance of the constituents consists of Fe and impurities.

Next, the microstructure of the steel sheet will be explained.

The microstructure of the steel sheet of the present embodiment is a microstructure comprised of ferrite and inclusions and/or precipitates. The ratio of the length of the ferrite crystal grains in the sheet thickness direction with respect to the length in the sheet width direction (aspect ratio) is 0.70 or more. A large aspect ratio means less crushing of crystal grains due to rolling.

Figure 2:
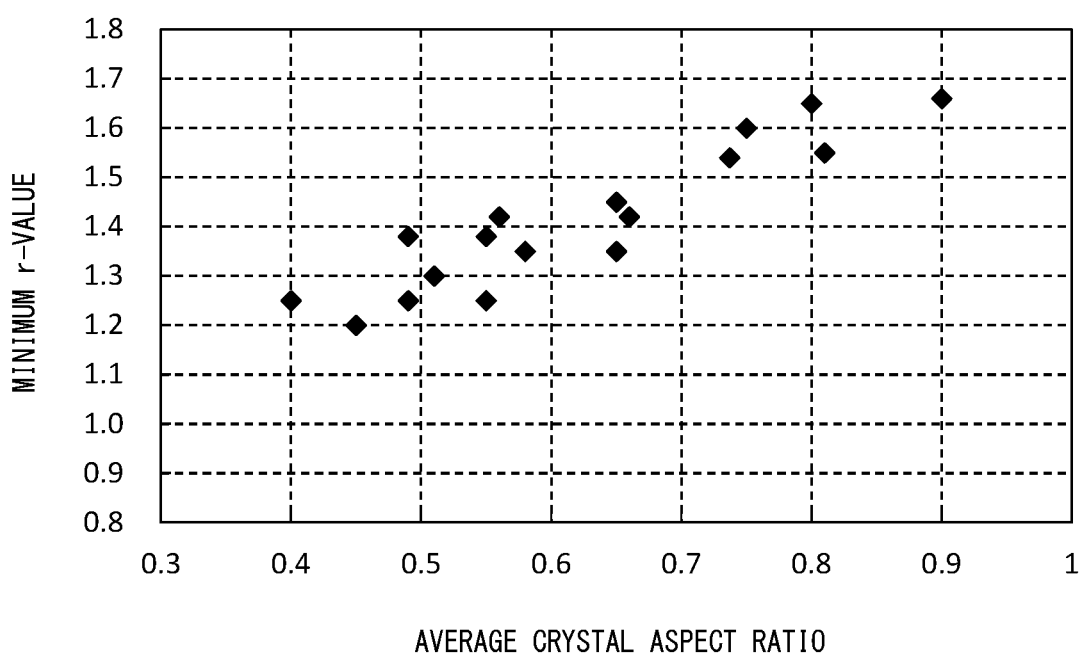
FIG. 2 is a view showing a relationship of an aspect ratio of crystals and a minimum r-value.

As shown in FIG. 1, by making the amount of Al added less than 0.005 mass %, it is possible to make the aspect ratio of the ferrite crystal grains 0.70 or more. As shown in FIG. 2, securing an aspect ratio of 0.70 or more becomes an effective means for making the minimum r-value 1.50 or more without special addition of N. That is, suppressing the addition of Al becomes an effective means for making the minimum r-value 1.50 or more.

Furthermore, by controlling the aspect ratio, it is possible to improve the total elongation of the steel sheet. In high strength steel sheet for cans with a yield strength of 500 MPa or more, in general, the total elongation is small such as 1.0 to 2.5% or so, but by suitably controlling the aspect ratio, it is possible to obtain a total elongation of preferably 3.0% or more, more preferably 4.0% or more. The total elongation is measured by Metal Materials: Tensile Testing shown in "JIS Z 2241 (2011)".

The method of measuring the aspect ratio is as follows:

At the center of sheet width of the steel sheet, the cross-section vertical to the rolling direction is etched by Nital. This is observed by an optical microscope enlarged by 1000×. In a field of the total thickness (mm)×0.20 mm, the length of the crystal structures in the sheet thickness direction and the length in the sheet width direction are measured. The length in sheet thickness direction/length in sheet width direction is called the "aspect ratio". Further, the aspect ratios of all structures in the field are calculated and the average value is made the aspect ratio. The observation may be conducted for one field.

The steel sheet of the present embodiment has a yield strength of 500 MPa or more. Further, in the range of the rolling direction of 0 to 90°, the minimum value of the r-value is 1.50 or more, the average value of the r-value is 1.70 or more, and the difference between the maximum value and the minimum value of the r-value is 0.50 or less.

The yield strength is made 500 MPa or more from the viewpoint of securing the buckling strength of the can body. The yield strength is measured by Metal Materials: Tensile Testing shown in "JIS Z 2241 (2011)". By making the constituents of the steel the above ranges and, as explained later, applying suitable temper rolling, the yield strength can be made 500 MPa or more.

If the yield strength becomes higher, due to buckling of the steel sheet, wrinkles are easily formed. For this reason, in steel sheet for cans, control of the r-value becomes important.

If the yield strength is 500 MPa or so, to secure good formability, a 1.1 or so r-value is sought. Further, if the yield strength is 700 MPa or so, a 1.5 or so r-value is sought.

As methods for forming general steel sheet for cans, there are the method of re-forming the sheet into a cylinder so that the rolling direction becomes the circumferential direction of the can (normal grain) and the method of re-forming the sheet into a cylinder so that the direction perpendicular to rolling becomes the circumferential direction of the can (reverse grain). No matter what the direction, a can is produced, so the minimum value of the r-value is preferably 1.50 or more.

The steel sheet of the present embodiment has a minimum r-value of 1.50 or more and an average r-value of 1.70 or more in the range of 0 to 90° with respect to the rolling direction, so even if the yield strength is 700 MPa, formation of wrinkles at the time of shaping can be suppressed. The minimum r-value is preferably 1.60 or more, more preferably 1.70 or more. The average r-value is preferably 1.75 or more, more preferably 1.80 or more. The maximum value of the r-value is not particularly limited, but is substantially 2.50 or less.

Further, the steel sheet of the present embodiment has a difference of the maximum value and minimum value of the r-value in the range of 0 to 90° with respect to the rolling direction of 0.5 or less. That is, the in-plane anisotropy is small, so the later explained ear rate becomes excellent and the earring at a two-piece body at the time of can making becomes smaller.

The r-value is often measured at 0°, 45°, and 90° with respect to the rolling direction, but the minimum r-value, the maximum r-value, and the average r-value in the present embodiment are found from values obtained by measurement of the r-value in increments of 1° in the range of 0 to 90° with respect to the rolling direction.

The r-value is calculated based on crystal orientation data obtained by the EBSD (electron backscatter diffraction) method using a scanning electron microscope.

Next, the method for manufacturing the steel sheet of the present embodiment will be explained.

In the present embodiment, the constituents of the steel are adjusted as explained above and crystal grain growth is promoted in the annealing process after hot rolling, coiling, and cold rolling to control the aspect ratio of the ferrite crystal grains to a suitable value. Due to this, it is possible to achieve both high strength and a high r-value at a low cost without adding large amounts of alloy elements and N.

Annealing can for example be performed by continuous annealing. If the annealing temperature is too low, the steel becomes a nonrecrystallized state and hardens. If too high, the steel softens and operations are hindered, so the temperature is preferably made 700 to 800° C.

Further, the annealing is performed so that the value derived from equation (1) relating to the soaking zone temperature (T), soaking zone passage time (t), and tension at the time of soaking zone passage (X)

$$0.027 \times \ln(t) \times T \times \ln(X) \quad (1)$$

(where, T is the annealing temperature (° C.), "t" is the time of passage through the annealing soaking zone (sec), and X is the sheet tension at the soaking zone (MPa))

satisfies 100 to 280 and the r-value is controlled.

Figure 3:
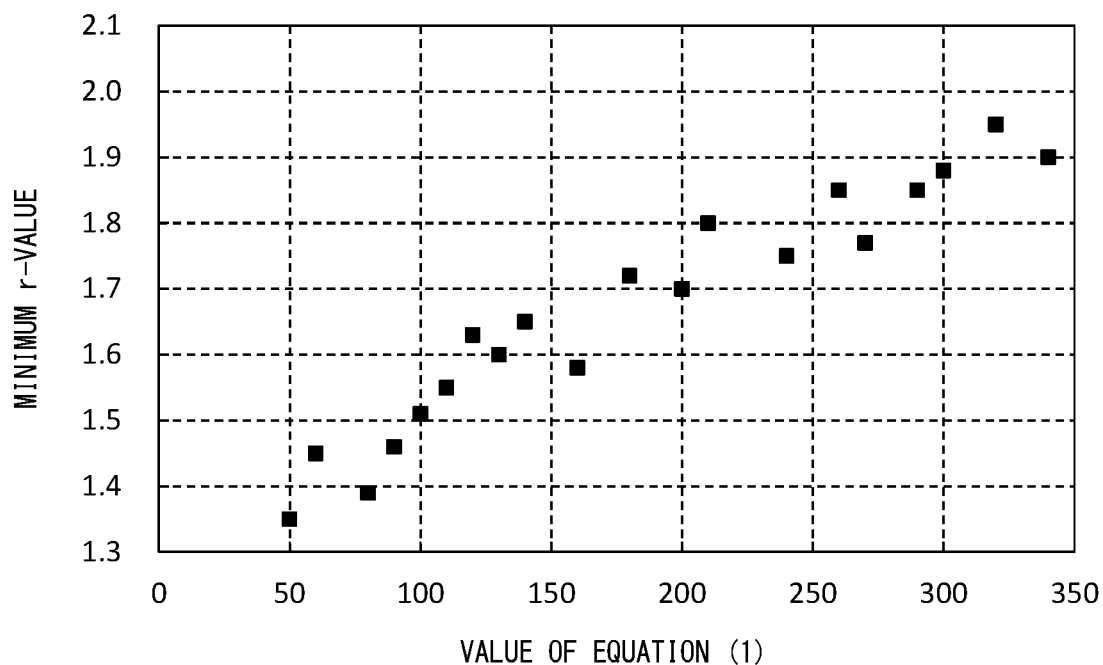
FIG. 3 is a view showing a relationship between a value of equation (1) and a minimum r-value.
Figure 4:
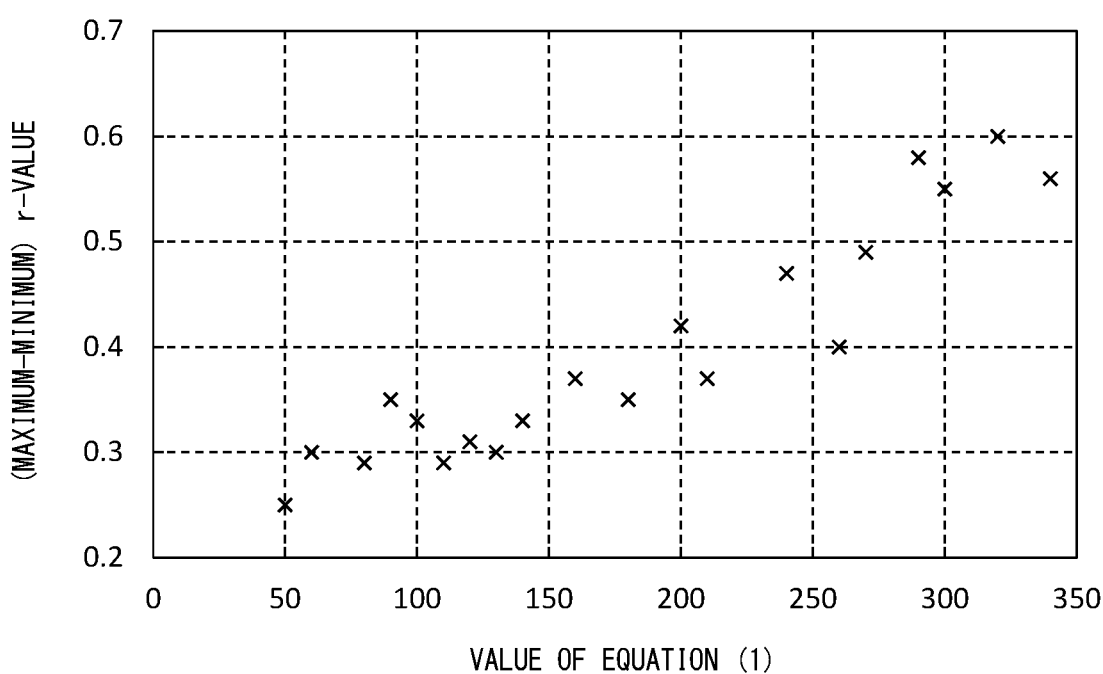
FIG. 4 is a view showing a relationship between a value of equation (1) and a (maximum-minimum) r-value.

As shown in FIG. 3, by making the value of equation (1) 100 or more, the minimum r-value can be made 1.50 or more. Further, as shown in FIG. 4, by making the value of equation (1) 280 or less, the difference between the maximum r-value and the minimum r-value can be made 0.50 or less.

Furthermore, by making the value of equation (1) the above range, it is possible to reduce variation in the r-value in the width direction of the steel sheet. The variation of the r-value in the sheet width direction is obtained by measuring the average r-values of different locations based on the above measurement method at the three locations of the center part of steel sheet and positions of respectively 10 mm from the two ends in the width direction of the steel sheet.

The soaking zone passage time is preferably made 25 to 60 seconds in the range satisfying equation (1). Further, the sheet tension in the soaking zone is preferably made 5 to 25 MPa in the range satisfying equation (1).

Next, the annealed steel sheet is temper rolled. The temper rolling can for example be performed using a two stand temper pass mill. The rolling rate of the temper rolling is made 18% or more to make the yield strength of the steel sheet 500 MPa or more. The upper limit of the rolling rate is not particularly prescribed, but 40% is close to the upper limit of the rolling rate on the temper rolling facility. This is a value of a level where even if raising the rolling rate any further, no increase in the yield strength can be expected.

After that, the surface of the steel sheet may be plated with Sn, Cr, etc. as required. After plating, a resin film may be attached to one or both sides of the surface of the steel sheet.

Figure 5:
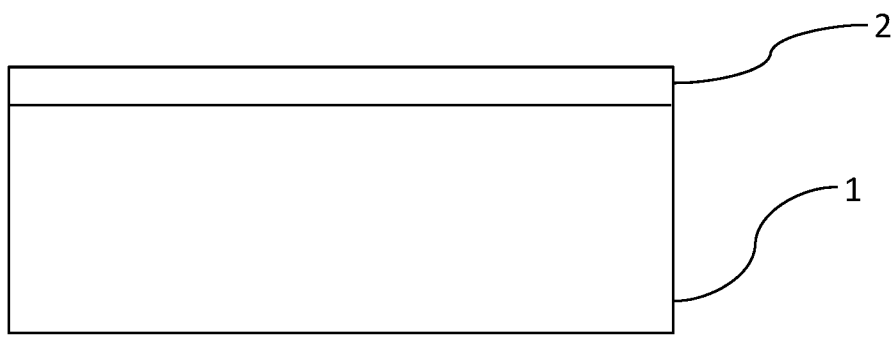
FIG. 5 gives schematic views of steel sheets having platings and/or resin films.
Figure 5:
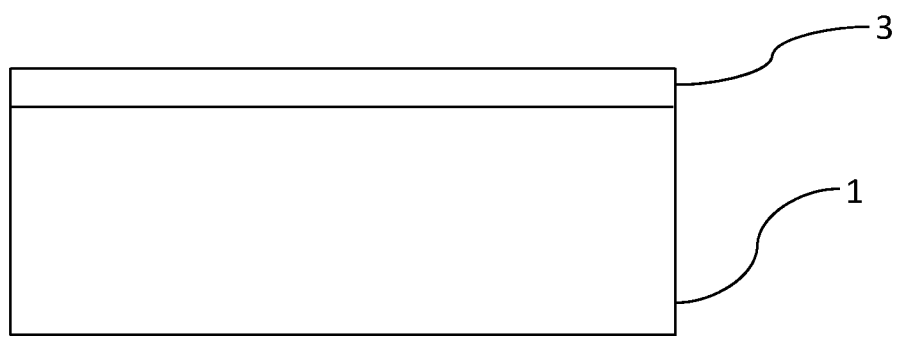
Figure 5:
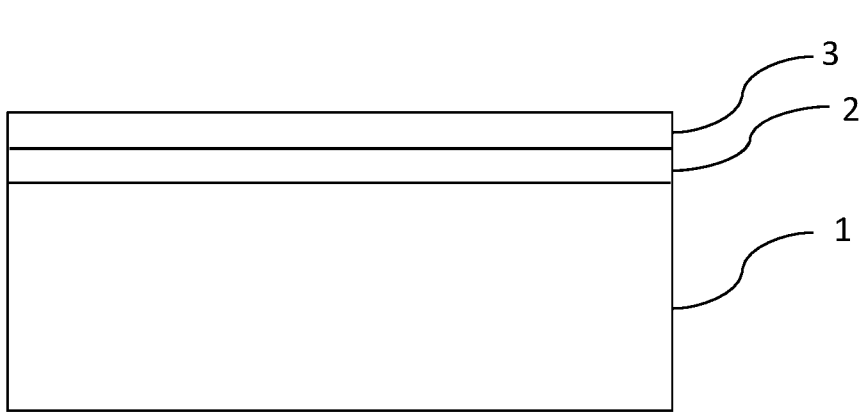

FIG. 5 gives schematic views of steel sheets having plating and/or resin film. (a) shows the case of having only a plating, (b) shows the case of having only a resin film, and (c) shows the case of having a plating and resin film. In FIG. 5, examples of provision of plating and/or resin film on only one side of the steel sheet are shown, but these may also be provided on both sides of the steel sheet. Further, it is also possible to provide a plating on one side and a plating and resin film on the other side or otherwise configure the two sides differently.

As explained above, in the present embodiment, the content of Al is reduced to inhibit the formation of AlN to control the aspect ratio of the ferrite crystal grains. Further, by suitably controlling the annealing conditions combining the soaking zone temperature, soaking zone passage time, and tension when passing through the soaking zone, it is possible to control the growth of the crystal grains to achieve a high r-value, reduce the difference between the maximum value and minimum value of the r-value, and further reduce the variation in r-value in the sheet width direction.

Further, by reducing the content of Al, solute N remains and high strength can be secured.

As a result, it is possible to obtain steel sheet for cans high in strength and excellent in formability and appearance. In particular, even in steel sheet for cans of a thickness of less than 0.2 mm, it is possible to obtain high strength while it is possible to secure excellent formability and appearance. Further, even if the steel sheet for cans demanded for mainly applications of two-piece bodies is reduced in gauge (made thinner), it is possible to satisfy the "higher strength (securing can buckling strength)", "suppression of formation of wrinkles in neck-in working", and "lower ear rate".

In the present embodiment, the thickness of the steel sheet is not particularly limited, but the thickness of the steel sheet for cans is generally 0.12 to 0.18 mm or so.

EXAMPLES

Example 1

The cold rolled steel sheets of the constituents shown in Table 1 were annealed under the annealing temperatures, soaking zone passage times, and tensions of the sheets in the soaking zones shown in Table 2 and were further temper rolled to manufacture steel sheets for cans with thicknesses of 0.14 to 0.16 mm.

The obtained steel sheets were measured by the above-mentioned methods for the aspect ratios of the ferrite crystal grains, the yield strengths, the minimum r-values, the average r-values, and the differences between the maximum r-values and the minimum r-values. Further, the following procedures were used to evaluate the wrinkles, ear rates, formabilities, and appearances.

The wrinkles were evaluated by visually examining the can shapes after can making, checking for any wrinkles, and evaluating the case with no wrinkles as "G" (Good) and the case of wrinkles as "P" (Poor).

The ear rates were calculated by punching out φ124 mm disks from the steel sheets, using a punch and die to prepare columnar shaped φ60 mm cups, measuring the heights of the total circumferences, and calculating the variations. The heights were measured at 360 points on the total circumferences of the cups to calculate the average values. The (maximum value-minimum value)/average value×100 was defined as the ear rate. 5% or less was deemed passing.

The formabilities were evaluated by visually checking for cracking or twisting of worked products after formation and evaluating the case with no cracking or twisting as "G" (Good) and the case of cracking or twisting as "P" (Poor).

The appearances were evaluated by visually examining the surfaces of the steel sheets, checking for any defects or patterns, and evaluating the case with no defects or patterns as "G" (Good) and the case of defects or patterns as "P" (Poor).

TABLE 1

| Experiment no. | Chemical composition (mass %) | | | | | | |
|---|---|---|---|---|---|---|---|
| | C | Si | Mn | P | S | N | Al |
| 1 | 0.0010 | 0.015 | 0.20 | 0.015 | 0.013 | 0.0016 | 0.001 |
| 2 | 0.0015 | 0.021 | 0.25 | 0.044 | 0.025 | 0.0030 | 0.002 |
| 3 | 0.0014 | 0.018 | 0.23 | 0.030 | 0.016 | 0.0028 | 0.002 |
| 4 | 0.0017 | 0.017 | 0.31 | 0.025 | 0.018 | 0.0042 | 0.001 |
| 5 | 0.0016 | 0.012 | 0.26 | 0.020 | 0.015 | 0.0040 | 0.001 |
| 6 | 0.0023 | 0.024 | 0.45 | 0.012 | 0.024 | 0.0020 | 0.004 |
| 7 | 0.0028 | 0.042 | 0.22 | 0.008 | 0.032 | 0.0035 | 0.003 |
| 8 | 0.0030 | 0.029 | 0.25 | 0.015 | 0.017 | 0.0029 | 0.001 |
| 9 | 0.0035 | 0.021 | 0.28 | 0.011 | 0.026 | 0.0049 | 0.001 |
| 10 | 0.0008 | 0.023 | 0.16 | 0.029 | 0.022 | 0.0025 | 0.003 |
| 11 | <u>0.0048</u> | 0.014 | 0.25 | 0.018 | 0.008 | 0.0018 | 0.002 |
| 12 | <u>0.0025</u> | 0.016 | 0.27 | 0.016 | 0.013 | 0.0045 | <u>0.008</u> |
| 13 | 0.0018 | 0.008 | 0.24 | 0.014 | 0.009 | <u>0.0071</u> | 0.001 |
| 14 | 0.0029 | 0.013 | 0.23 | 0.013 | 0.012 | 0.0024 | 0.004 |
| 15 | 0.0014 | 0.020 | 0.30 | 0.013 | 0.018 | 0.0031 | 0.002 |
| 16 | 0.0017 | 0.023 | 0.21 | 0.013 | 0.024 | 0.0019 | 0.003 |
| 17 | 0.0021 | 0.014 | 0.24 | 0.013 | 0.011 | 0.0023 | 0.001 |
| 18 | 0.0013 | 0.017 | 0.26 | 0.013 | 0.013 | 0.0028 | 0.001 |
| 19 | 0.0017 | 0.023 | 0.31 | 0.013 | 0.017 | 0.0017 | 0.002 |
| 20 | 0.0023 | 0.022 | 0.18 | <u>0.043</u> | 0.030 | 0.0035 | 0.001 |
| 21 | 0.0022 | 0.015 | <u>0.60</u> | 0.007 | 0.018 | 0.0040 | 0.001 |
| 22 | 0.0018 | 0.028 | <u>0.08</u> | 0.019 | 0.021 | 0.0024 | 0.002 |
| 23 | 0.0013 | <u>0.060</u> | 0.18 | 0.011 | 0.015 | 0.0018 | 0.003 |
| 24 | 0.0021 | 0.017 | 0.29 | 0.017 | <u>0.045</u> | 0.0022 | 0.001 |

TABLE 2

| Experiment no. | Annealing conditions | | | Temper rolling rate | Sheet thickness (mm) | Aspect ratio | Equation (1) | Yield strength (MPa) | Total elongation (%) | In-plane min. r-value |
|---|---|---|---|---|---|---|---|---|---|---|
| | Annealing temp. (° C.) | Soaking zone passage time (sec) | Sheet tension at soaking zone (MPa) | | | | | | | |
| 1 | 740 | 45 | 8 | 20% | 0.14 | 0.90 | 158 | 515 | 5.2 | 1.66 |
| 2 | 745 | 34 | 13 | 20% | 0.15 | 0.77 | 182 | 536 | 4.5 | 1.70 |
| 3 | 750 | 32 | 10 | 20% | 0.16 | 0.80 | 162 | 528 | 4.7 | 1.68 |
| 4 | 760 | 41 | 21 | 25% | 0.14 | 0.85 | 232 | 548 | 3.9 | 1.78 |
| 5 | 750 | 36 | 15 | 25% | 0.15 | 0.82 | 197 | 540 | 4.1 | 1.72 |
| 6 | 735 | 52 | 10 | 27% | 0.16 | 0.72 | 181 | 581 | 2.8 | 1.70 |
| 7 | 750 | 25 | 15 | 27% | 0.14 | 0.74 | 177 | 592 | 3.1 | 1.69 |
| 8 | 740 | 40 | 12 | 30% | 0.15 | 0.78 | 183 | 603 | 3.7 | 1.70 |
| 9 | 770 | 32 | 9 | 30% | 0.16 | 0.81 | 158 | 617 | 3.2 | 1.66 |
| 10 | 745 | 41 | 10 | 25% | 0.15 | 0.75 | 172 | <u>495</u> | 6.2 | 1.75 |
| 11 | 725 | 38 | 8 | 25% | 0.15 | 0.77 | 148 | 641 | 1.0 | <u>1.48</u> |
| 12 | 715 | 44 | 13 | 25% | 0.15 | <u>0.62</u> | 187 | 561 | 1.8 | <u>1.45</u> |
| 13 | 740 | 35 | 12 | 30% | 0.16 | 0.80 | 177 | 605 | 3.0 | <u>1.39</u> |
| 14 | 650 | 32 | 5 | 30% | 0.14 | <u>0.68</u> | <u>98</u> | 594 | 1.1 | <u>1.47</u> |

TABLE 2-continued

| | | | | | | | | | | |
|---|---|---|---|---|---|---|---|---|---|---|
| 15 | 710 | 13 | 7 | 27% | 0.15 | 0.66 | 96 | 587 | 1.5 | 1.46 |
| 16 | 750 | 30 | 4 | 27% | 0.16 | 0.64 | 95 | 577 | 1.7 | 1.43 |
| 17 | 830 | 60 | 22 | 30% | 0.14 | 0.85 | 284 | 552 | 2.8 | 1.85 |
| 18 | 780 | 75 | 25 | 30% | 0.15 | 0.90 | 293 | 560 | 3.1 | 1.87 |
| 19 | 770 | 55 | 30 | 30% | 0.16 | 0.77 | 283 | 565 | 3.5 | 1.83 |
| 20 | 770 | 50 | 10 | 30% | 0.14 | 0.79 | 187 | 655 | 2.2 | 1.71 |
| 21 | 790 | 25 | 8 | 30% | 0.15 | 0.81 | 143 | 632 | 2.5 | 1.63 |
| 22 | 745 | 32 | 18 | 27% | 0.16 | 0.78 | 201 | 593 | 2.8 | 1.75 |
| 23 | 735 | 34 | 15 | 27% | 0.15 | 0.74 | 190 | 589 | 2.6 | 1.74 |
| 24 | 750 | 27 | 13 | 27% | 0.16 | 0.83 | 171 | 595 | 2.9 | 1.70 |

| Experiment no. | Max. r-value-min r-value | Average r-value | hype of plating, if any | Wrinkling evaluation | Ear rate (%) | Formability evaluation | Appearance | |
|---|---|---|---|---|---|---|---|---|
| 1 | 0.36 | 1.80 | | G | 3.9 | G | G | Ex. |
| 2 | 0.38 | 1.85 | Sn plating | G | 4.0 | G | G | |
| 3 | 0.36 | 1.82 | Cr plating | G | 3.9 | G | G | |
| 4 | 0.43 | 1.95 | | G | 4.4 | G | G | |
| 5 | 0.40 | 1.88 | Sn plating | G | 4.2 | G | G | |
| 6 | 0.38 | 1.85 | Cr plating | G | 4.0 | G | G | |
| 7 | 0.37 | 1.84 | | G | 4.0 | G | G | |
| 8 | 0.38 | 1.85 | Laminate | G | 4.0 | G | G | |
| 9 | 0.36 | 1.80 | | G | 3.9 | G | G | |
| 10 | 0.37 | 1.90 | Cr plating | G | 4.0 | G | G | Comp. ex. |
| 11 | 0.33 | 1.61 | Cr plating | P | 3.7 | G | G | |
| 12 | 0.40 | 1.61 | Sn plating | P | 4.2 | G | G | |
| 13 | 0.35 | 1.53 | | P | 3.8 | G | G | |
| 14 | 0.28 | 1.58 | Cr plating | P | 3.3 | G | G | |
| 15 | 0.33 | 1.59 | Laminate | P | 3.7 | G | G | |
| 16 | 0.30 | 1.55 | Sn plating | P | 3.4 | G | G | |
| 17 | 0.51 | 2.05 | Cr plating | G | 5.1 | G | G | |
| 18 | 0.55 | 2.09 | Laminate | G | 5.4 | G | G | |
| 19 | 0.57 | 2.06 | Sn plating | G | 5.5 | G | G | |
| 20 | 0.39 | 1.87 | | G | 4.1 | P | G | |
| 21 | 0.34 | 1.77 | Cr plating | G | 3.7 | P | G | |
| 22 | 0.40 | 1.91 | | G | 4.2 | G | P | |
| 23 | 0.39 | 1.90 | Sn plating | G | 4.1 | G | P | |
| 24 | 0.37 | 1.85 | | G | 4.0 | G | P | |

The steel sheet for cans according to the present embodiment is excellent in wrinkle evaluation and evaluation of the ear rate and exhibited excellent performance in formability and appearance as well.

Example 2

The No. 5 and No. 12 steel sheets of Table 1 and Table 2 were measured for variation in the r-value in the sheet width direction. The variation in the r-value was measured at the three locations of the center part of steel sheet and positions of respectively 10 mm from the two ends. In the same way as Example 1, the average r-value was measured and the difference of the maximum value and minimum value of the average r-values of the three locations was used for evaluation.

The results are shown in Table 3. According to the present example, it could be confirmed that the variation in the r-value in the sheet width direction is low.

TABLE 3

| | Edge | Center | Edge | Maximum r-value-minimum r-value (3 locations) |
|---|---|---|---|---|
| No. 5 | 1.83 | 1.88 | 1.82 | 0.06 |
| No. 12 | 1.53 | 1.61 | 1.51 | 0.10 |

Above, examples were used to explain embodiments of the present invention, but the present invention is not limited to the above embodiments and may of course be applied within a range not deviating from the gist of the present invention.

REFERENCE SIGNS LIST 1. steel sheet
2. Sn or Cr plated layer
3. resin film

The invention claimed is:
1. A steel sheet comprising, by mass %,
C: 0.0010 to 0.0035%,
Si: 0.050% or less,
Mn: 0.10 to 0.50%,
P: 0.040% or less,
S: 0.040% or less,
Al: less than 0.005%,
N: 0.0050% or less and
a balance of Fe and unavoidable impurities,
wherein
an average value of a ratio of lengths of ferrite crystal grains in a sheet thickness direction to lengths of ferrite crystal grains in a sheet width direction is 0.70 or more,
a yield strength is 500 MPa or more, and,
in a range of 0 to 90° to a rolling direction, a minimum r-value is 1.50 or more, an average r-value is 1.70 or more, and a difference between a maximum r-value and the minimum r-value is 0.50 or less.
2. The steel sheet according to claim 1, wherein in the range of 0 to 90° to the rolling direction, the minimum r-value is 1.60 or more and the average r-value is 1.75 or more.

3. The steel sheet according to claim 1, wherein a surface of the steel sheet contains an Sn plating layer.

4. The steel sheet according to claim 3, wherein a surface of one or both sides further contains a resin film.

5. The steel sheet according to claim 1, wherein a surface of the steel sheet contains a Cr plating layer.

6. The steel sheet according to claim 5, wherein a surface of one or both sides further contains a resin film.

7. The steel sheet according to claim 1, wherein a surface of one or both sides further contains a resin film.

8. A method of producing the steel sheet according to claim 1, comprising hot rolling, pickling, and cold rolling a slab comprising, by mass %,
C: 0.0010 to 0.0035%,
Si: 0.050% or less,
Mn: 0.10 to 0.50%,
P: 0.040% or less,
S: 0.040% or less,
Al: less than 0.005%,
N: 0.0050% or less and
a balance of Fe and unavoidable impurities,
annealing an obtained cold rolled steel sheet under a condition satisfying the following equation (1), and
temper rolling the steel sheet:

$$100 \leq 0.027 \times \ln(t) \times T \times \ln(X) \leq 280 \quad (1):$$

where, "T" is an annealing temperature of which unit is ° C., "t" is a passage time, of which unit is sec, through a soaking zone, and "X" is a sheet tension of which unit is MPa at the soaking zone.

9. A method of producing the steel sheet according to claim 3, comprising hot rolling, pickling, and cold roiling a slab comprising, by mass%,
C: 0.0010 to 0.0035%,
Si. 0.050% or less,
Mn: 0.10 to 0.50%,
P: 0.040% or less,
S: 0.040% or less,
Al: less than 0.005%,
N: 0.0050% or less and
a balance of Fe and unavoidable impurities,
annealing an obtained cold rolled steel sheet under a condition satisfying the following equation (1),
temper rolling the steel sheet, and
plating a surface of the steel sheet with Sn:

$$100 \leq 0.027 \times \ln(t) \times T \times \ln(X) \leq 280 \quad (1):$$

where, "T" is an annealing temperature of which unit is ° C., "t" is a passage time, of which unit is sec, through a soaking zone, and "X" is a sheet tension of which unit is MPa at the soaking zone.

10. A method of producing the steel sheet according to claim 4, comprising hot rolling, pickling, and cold rolling a slab comprising, by mass%,
C: 0.0010 to 0.0035%,
Si. 0.050% or less,
Mn: 0.10 to 0.50%,
P: 0.040% or less,
S: 0.040% or less,
Al: less than 0.005%,
N: 0.0050% or less and
a balance of Fe and unavoidable impurities,
annealing an obtained cold rolled steel sheet under a condition satisfying the following equation (1),
temper rolling the steel sheet, and
plating a surface of the steel sheet with Sn, and
covering a surface of one or both sides of the steel sheet with a resin film:

$$100 \leq 0.027 \times \ln(t) \times T \times \ln(X) \leq 280 \quad (1):$$

where, "T" is an annealing temperature of which unit is ° C., "t" is a passage time, of which unit is sec, through a soaking zone, and "X" is a sheet tension of which unit is MPa at the soaking zone.

11. A method of producing the steel sheet according to claim 5, comprising hot rolling, pickling, and cold rolling a slab comprising, by mass%,
C: 0.0010 to 0.0035%,
Si. 0.050% or less,
Mn: 0.10 to 0.50%,
P: 0.040% or less,
S: 0.040% or less,
Al: less than 0.005%,
N: 0.0050% or less and
a balance of Fe and unavoidable impurities,
annealing an obtained cold rolled steel sheet under a condition satisfying the following equation (1),
temper rolling the steel sheet, and
plating a surface of the steel sheet with Cr:

$$100 \leq 0.027 \times \ln(t) \times T \times \ln(X) \leq 280 \quad (1):$$

where, "T" is an annealing temperature of which unit is ° C., "t" is a passage time, of which unit is sec, through a soaking zone, and "X" is a sheet tension of which unit is MPa at the soaking zone.

12. A method of producing the steel sheet according to claim 6, comprising hot rolling, pickling, and cold rolling a slab comprising, by mass%,
C: 0.0010 to 0.0035%,
Si. 0.050% or less,
Mn: 0.10 to 0.50%,
P: 0.040% or less,
S: 0.040% or less,
Al: less than 0.005%,
N: 0.0050% or less and
a balance of Fe and unavoidable impurities,
annealing an obtained cold rolled steel sheet under a condition satisfying the following equation (1),
temper rolling the steel sheet, and
plating a surface of the steel sheet with Cr, and
covering a surface of one or both sides of the steel with a resin film:

$$100 \leq 0.027 \times \ln(t) \times T \times \ln(X) \leq 280 \quad (1):$$

where, "T" is an annealing temperature of which unit is ° C., "t" is a passage time, of which unit is sec, through a soaking zone, and "X" is a sheet tension of which unit is MPa at the soaking zone.

13. A method of producing the steel sheet according to claim 7, comprising hot rolling, pickling, and cold rolling a slab comprising, by mass%,
C: 0.0010 to 0.0035%,
Si: 0.050% or less,
Mn: 0.10 to 0.50%,
P: 0.040% or less,
S: 0.040% or less,
Al: less than 0.005%,
N: 0.0050% or less and
a balance of Fe and unavoidable impurities,
annealing an obtained cold rolled steel sheet under a condition satisfying the following equation (1),
temper rolling the steel sheet, and covering a surface of one or both sides of the steel sheet with a resin film:

$$100 \leq 0.027 \times \ln(t) \times T \times \ln(X) \leq 280 \qquad (1):$$

where, "T" is an annealing temperature of which unit is °C., "t" is a passage time, of which unit is sec, through a soaking zone, and "X" is a sheet tension of which unit is MPa at the soaking zone.

* * * * *